US011742958B2

(12) United States Patent
Sen et al.

(10) Patent No.: US 11,742,958 B2
(45) Date of Patent: Aug. 29, 2023

(54) COMMUNICATION DEVICE AND METHOD OF MAKING THE SAME

(71) Applicant: Purdue Research Foundation, West Lafayette, IN (US)

(72) Inventors: Shreyas Sen, West Lafayette, IN (US); Shovan Maity, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/027,634

(22) Filed: Sep. 21, 2020

(65) Prior Publication Data

US 2021/0258080 A1 Aug. 19, 2021

Related U.S. Application Data

(60) Provisional application No. 62/903,619, filed on Sep. 20, 2019.

(51) Int. Cl.
*H04B 5/00* (2006.01)
*H04B 13/00* (2006.01)

(52) U.S. Cl.
CPC ......... *H04B 13/005* (2013.01); *H04B 5/0012* (2013.01); *H04B 5/0031* (2013.01)

(58) Field of Classification Search
CPC ...... H04B 13/005; H04B 5/0012; H04B 5/02; H04B 1/48; H04B 5/0031; H04B 1/16
See application file for complete search history.

(56) References Cited

U.S. PATENT DOCUMENTS

| | | | | |
|---|---|---|---|---|
| 11,207,526 | B2* | 12/2021 | Sheldon | A61N 1/378 |
| 11,234,280 | B2* | 1/2022 | Pavlov | G08B 1/08 |
| 2021/0111744 | A1* | 4/2021 | Sen | H04B 1/123 |
| 2021/0138232 | A1* | 5/2021 | Paz | A61N 1/36021 |

* cited by examiner

*Primary Examiner* — Nhan T Le
(74) *Attorney, Agent, or Firm* — Maginot, Moore & Beck LLP

(57) ABSTRACT

A method of using a HBC device includes enabling electro-quasistatic communication on a transmitter, wherein the enabling electro-quasistatic communication includes receiving an activation signal through an input. The enabling the electro-quasistatic communication additionally includes transmitting a digital data signal to a transmitter logic circuit. The enabling the electro-quasistatic communication further includes modulating an electro-quasistatic carrier signal by the digital data signal using a modulator, thereby producing a modulated electro-quasistatic signal. Additionally, the enabling the electro-quasistatic communication includes transmitting the electro-quasistatic signal from the transmitter logic circuit to a general purpose input output circuit. Furthermore, the enabling the electro-quasistatic communication includes coupling the electro-quasistatic signal on a human body through an electrode, thereby enabling electro-quasistatic communication. The transmitter includes the electrode. Next, the method includes transmitting the electro-quasistatic signal through the human body. Additionally, the method includes coupling the electro-quasistatic signal onto a receiver electrode. The receiver includes the receiver electrode.

20 Claims, 9 Drawing Sheets

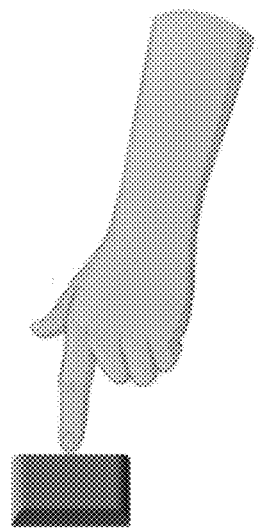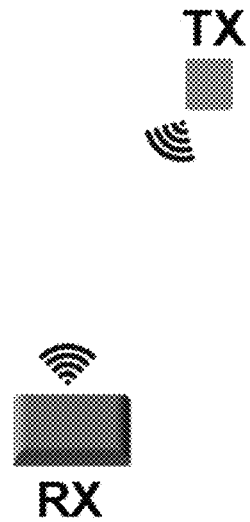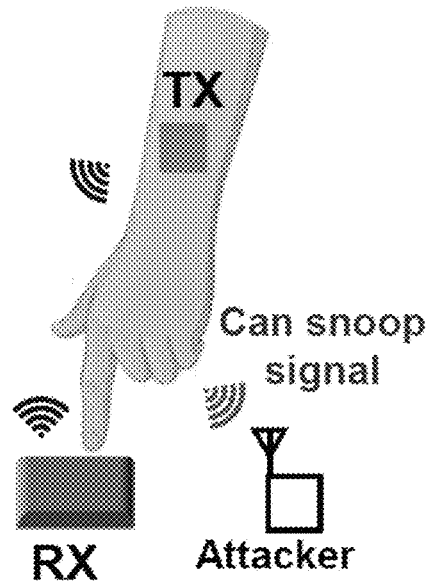
Figure 1(a)   Figure 1(b)   Figure 1(c)
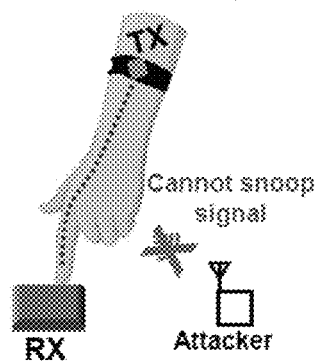
Figure 2

COMMUNICATION DEVICE AND METHOD OF MAKING THE SAME

CROSS-REFERENCE TO RELATED APPLICATIONS

The present U.S. patent application is related to and claims the priority benefit of U.S. Provisional Patent Application Ser. No. 62/903,619, filed Sep. 20, 2019, the contents of which is hereby incorporated by reference in its entirety into this disclosure.

ACKNOWLEDGEMENT OF GOVERNMENT SUPPORT

This invention was made with government support under FA9550-17-1-0450 awarded by Air Force Office of Scientific Research. The government has certain rights in the invention.

TECHNICAL FIELD

This disclosure relates to a communication device, method of using the same, and method of making the same.

BACKGROUND

This section introduces aspects that may help facilitate a better understanding of the disclosure. Accordingly, these statements are to be read in this light and are not to be understood as admissions about what is or is not prior art.

Decades of rapid advancement in semiconductor technology has enabled computing in cheap, small form factor everyday devices. Human users are now submerged in a sea of computers in the environment, with which they are constantly interacting. User interaction with the surrounding environment is one of the key aspects of ubiquitous computing. Communication between devices during a touch based interaction can significantly enhance the effect of a touch event and open up new interaction modalities in Human Computer Interaction. The standard method of achieving this is through coupling touch (FIG. 1(a)) and wireless communication (FIG. 1(b)) separately. Communication can also be performed by utilizing a touch sensor (example: capacitive touch sensor) along with some wireless communication protocol such as Bluetooth, Near Field Communication (NFC) (FIG. 1(c)). These protocols use radio waves, utilizing air as the communication medium. Wireless radio wave communication suffers from the problem of security and selectivity, as the signal gets transmitted through air medium and is available to any device within a certain range. As a result information may get communicated even when the devices are in close proximity even before touch. As a result, communication strictly during a touch event in a secure, selective manner is difficult to achieve with radio communication. Therefore, improvements are needed in the field.

SUMMARY

Various embodiments of the present application relate to communication devices that communicate securely and selectively strictly during a touch event, as indicated in FIG. 2. Human Body Communication (HBC) potentially provides such a secure, selective, natural way of touch based interaction between users and the environment, turning everyday objects into an interactive computing platform as well as providing a trusted communication channel. HBC uses the human body as the communication channel for interactions between devise on and around the body. The transmitter couples the signal into the body through a metal electrode. The signal goes through the skin layer and gets transmitted through the conductive tissues and fluids in the body and is picked up at the receiver end when it is in touch with the skin.

One aspect of the present application relates to a method of using a HBC device includes enabling electro-quasistatic communication on a transmitter, wherein the enabling electro-quasistatic communication includes receiving an activation signal through an input. The enabling the electro-quasistatic communication additionally includes transmitting a digital data signal to a transmitter logic circuit. The enabling the electro-quasistatic communication further includes modulating an electro-quasistatic carrier signal by the digital data signal using a modulator, thereby producing a modulated electro-quasistatic signal. The transmitter logic circuit includes the modulator. The modulated electro-quasistatic signal has a frequency ranging from 50 kHz to 5 MHz. Additionally, the enabling the electro-quasistatic communication includes transmitting the electro-quasistatic signal from the transmitter logic circuit to a general purpose input output circuit. Furthermore, the enabling the electro-quasistatic communication also includes coupling the electro-quasistatic signal on a human body through an electrode, thereby enabling electro-quasistatic communication, wherein the transmitter includes the electrode. Next, the method of using the HBC device includes transmitting the electro-quasistatic signal through the human body. Additionally, the method of using the HBC device includes coupling the electro-quasistatic signal onto a receiver electrode, wherein a receiver includes the receiver electrode. Moreover, the method of using the HBC device includes removing interferences from the electro-quasistatic signal using a filter, thereby producing a refined electro-quasistatic signal. Next, the method of using the HBC device include amplifying the refined electro-quasistatic signal using an amplifier, thereby generating an amplified electro-quasistatic signal. Furthermore, the method of using the HBC device includes converting the amplified electro-quasistatic signal into a digitized received signal. The method of using the HBC device also includes demodulating and decoding the digitized received signal using a decoding logic circuit.

Another aspect of the present application relates to a method of using a HBC device includes enabling resonant electro-quasistatic communication on a transmitter. The enabling the resonant electro-quasistatic communication includes receiving an activation signal through an input. Additionally, the enabling the resonant electro-quasistatic communication includes transmitting a digital data signal to a transmitter logic circuit. Moreover, the enabling the resonant electro-quasistatic communication includes modulating an electro-quasistatic carrier signal by the digital data signal using a modulator, thereby producing a modulated electro-quasistatic signal. The transmitter logic circuit includes the modulator. The modulated electro-quasistatic signal has a frequency ranging from 50 kHz to 5 MHz. Next, the enabling the resonant electro-quasistatic communication includes transmitting the electro-quasistatic signal from the transmitter logic circuit to a general purpose input output circuit. Furthermore, the enabling the resonant electro-quasistatic communication includes coupling the electro-quasistatic signal with at least one inductor, thereby enabling resonant electro-quasistatic communication. The transmitter includes the inductor. Additionally, the enabling the resonant electro-quasistatic communication includes coupling the resonant electro-quasistatic signal on a human body through an electrode, thereby enabling resonant electro-quasistatic communication. The transmitter includes the electrode. The method of using the HBC device includes transmitting the resonant electro-quasistatic signal through the human body. Next, the method of using the HBC device includes coupling the resonant electro-quasistatic signal onto at least one second inductor. The receiver includes the second inductor. Additionally, the method of using the HBC device includes coupling the resonant electro-quasistatic signal onto a receiver electrode from the second inductor. The receiver includes the receiver electrode. Further, the method of using the HBC device includes removing interferences from the resonant electro-quasistatic signal using a filter, thereby producing a refined resonant electro-quasistatic signal. The method of using the HBC device also includes amplifying the refined resonant electro-quasistatic signal using an amplifier, thereby generating an amplified resonant electro-quasistatic signal. Further, the method of using the HBC device includes converting the amplified resonant electro-quasistatic signal into a digitized received signal. The method of using the HBC device also includes demodulating and decoding the digitized received signal using a decoding logic circuit.

Still another aspect of the present application relates to a method of using a HBC device includes enabling electro-quasistatic communication on a transmitter, wherein the enabling electro-quasistatic communication includes receiving an activation signal through an input. The enabling the electro-quasistatic communication additionally includes transmitting a digital data signal to a transmitter logic circuit. The enabling the electro-quasistatic communication further includes modulating an electro-quasistatic carrier signal by the digital data signal using a modulator, thereby producing a modulated electro-quasistatic signal. The transmitter logic circuit includes the modulator. The modulated electro-quasistatic signal has a frequency ranging from 50 kHz to 5 MHz. Additionally, the enabling the electro-quasistatic communication includes transmitting the electro-quasistatic signal from the transmitter logic circuit to a general purpose input output circuit. Furthermore, the enabling the electro-quasistatic communication also includes coupling the electro-quasistatic signal on a human body through an electrode, thereby enabling electro-quasistatic communication, wherein the transmitter includes the electrode.

Still another aspect of the present application relates to a method of using a HBC device includes coupling an electro-quasistatic signal onto a receiver electrode, wherein a receiver includes the receiver electrode. Moreover, the method of using the HBC device includes removing interferences from the electro-quasistatic signal using a filter, thereby producing a refined electro-quasistatic signal. Next, the method of using the HBC device include amplifying the refined electro-quasistatic signal using an amplifier, thereby generating an amplified electro-quasistatic signal. Furthermore, the method of using the HBC device includes converting the amplified electro-quasistatic signal into a digitized received signal. The method of using the HBC device also includes demodulating and decoding the digitized received signal using a decoding logic circuit.

BRIEF DESCRIPTION OF DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 1(a) illustrates a Human Computer Interaction schematic through coupling touch. FIG. 1(b) illustrates a Human Computer Interaction schematic through wireless communication. FIG. 1(c) illustrates a Human Computer Interaction schematic through a touch sensor and wireless communication protocol.

FIG. 2 illustrates a Human Computer Interaction schematic, in accordance with one or more embodiments.

DETAILED DESCRIPTION

Figures 3A, 3B, 3C:
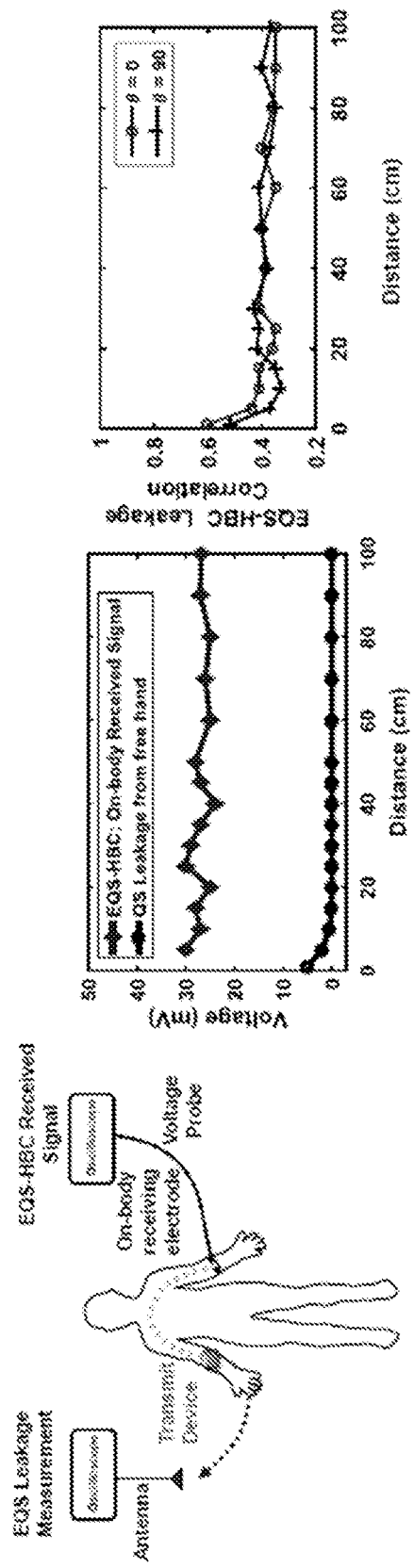
FIG. 3(a) illustrates a Human Computer Interaction schematic, in accordance with one or more embodiments.
FIG. 3(b) illustrates the measured voltage at different distances from the body when there is a signal transmission going on within the body at 1 MHz frequency.
FIG. 3(c) illustrates that the signal received only a few centimeters away from the body also shows minimal correlation with the transmitted signal.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Various embodiments of the present disclosure use certain system level design techniques and parameter choices to minimize signal leakage out of the body and provide selectivity and security during Human Computer Interactions, when communicating between the transmitter and the receiver as indicated in FIG. 3(a). The techniques include: a. Electro-quasistatic (EQS) HBC; b. Capacitive receiver termination; c. Voltage mode transmission and reception.

In EQS-HBC, the signal transmission between the transmitter and the receiver occurs through electric fields, which are contained within the human body. The signal propagation occurs primarily through the low impedance tissue layers underneath the skin. Propagation of electro-magnetic waves is not the primary mode of communication in this scenario. Hence, there is minimal signal leakage out of the body during ongoing signal transmission within the body. The low frequency operation of the HBC system enables electro-quasistatic operation and is the primary reason for the confinement of the transmitted signals within the body. FIG. 3(b) illustrates the measured voltage at different distances from the body when there is a signal transmission going on within the body at 1 MHz frequency. It can be seen that the amount of signal leakage in the air falls below 10 millivolts even 1 centimeter away from the human body, showing signal confinement primarily within the body. The signal received only a few centimeters away from the body also shows minimal correlation with the transmitted signal, as illustrated in FIG. 3(c). Hence, it will be nearly impossible for an attacker to successfully decipher the data transmission going on even from a distance of a few centimeters away from the body. However, to achieve electro-quasistatic operation, various embodiments relate to operation at low frequencies to minimize signal radiation. Some embodiments of the present disclosure relate to use of capacitive termination and voltage mode operation to reduce the human body channel loss at low frequencies and extend the bandwidth of the human body. This enables using the body as a wire-like communication channel, even utilizing the low frequencies.

The value and type of termination impedance of the human body channel at the receiver end is a contributing parameter in determining the operable frequency range of the HBC system. Resistive termination is the commonly used termination methodology in most previous studies. Various embodiments of the preset disclosure relate to design where the termination at the receiver end is done through a high impedance capacitor. Because of the capacitive return path between the transmitter and the receiver, using a capacitive termination at the receiver end creates a loss response independent of frequency. This reduces low frequency loss and enables HBC at these frequencies. In one or more embodiments, the receiver is carefully designed such that it's input impedance and hence the termination impedance seen by the channel is primarily capacitive.

Various embodiments of the present disclosure use voltage mode operation, where the transmitter sends out voltage through the system and the receiver is designed to pick up voltage. Voltage mode operation requires high impedance termination at the receiver end, which also enhances the amount of signal received for low frequency HBC operation. Hence, design of voltage mode systems also help reduce the low frequency loss. This in turn enables electro-quasistatic HBC, providing signal confinement within the body.

Figure 4A:
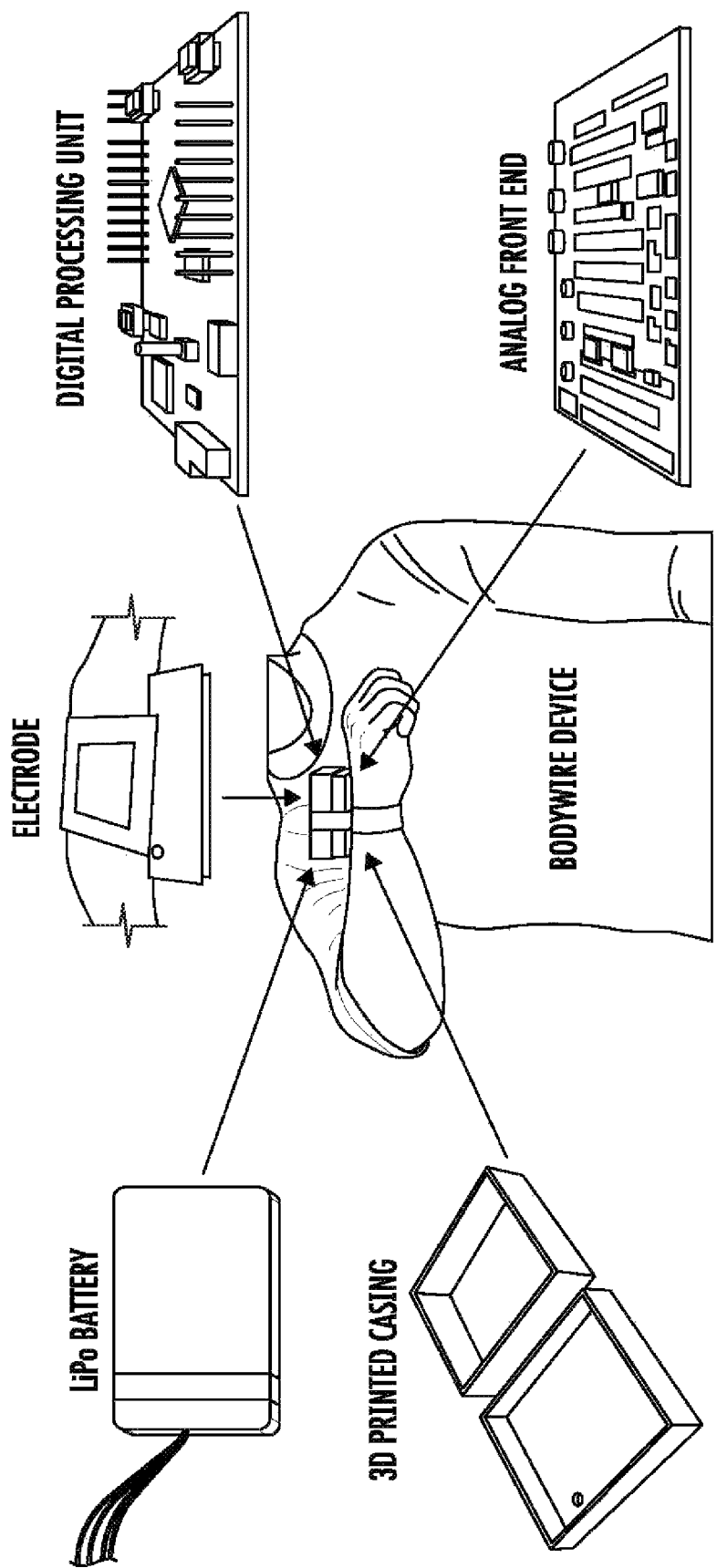
FIG. 4(a) illustrates a block diagram of a system for providing HBC during touch according to one embodiment.
Figure 4B:
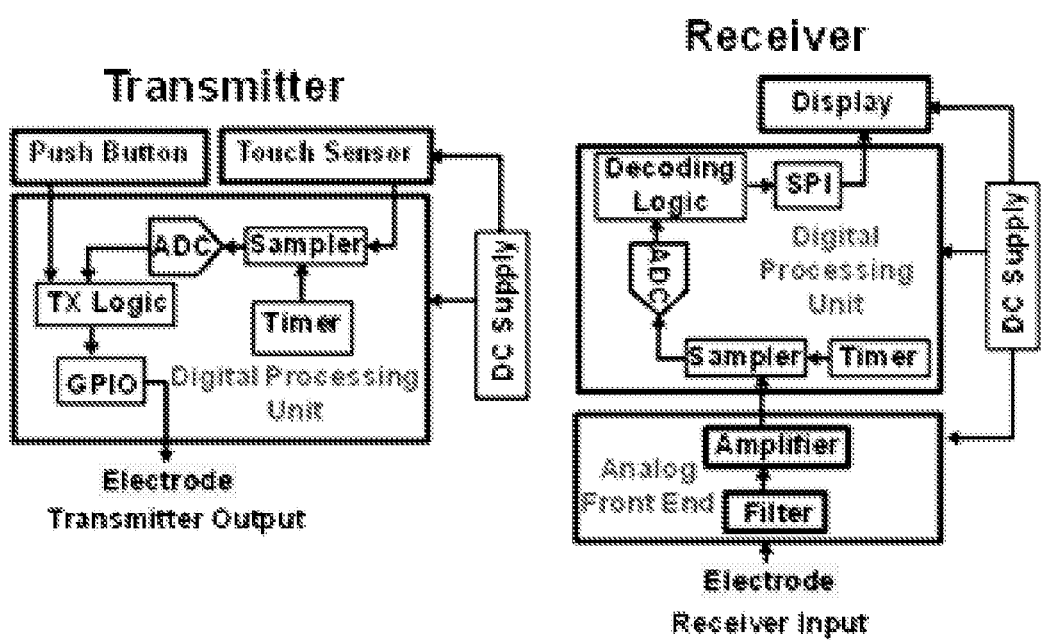
FIG. 4(b) illustrates an electrical schematic block diagram of the transmitter and receiver of system, in accordance with one or more embodiments.

FIG. 4(a) illustrates a block diagram of a system for providing HBC during touch according to one embodiment. As illustrated, the system includes a PCB analog front-end, TM4C123G microcontroller acting as the Digital Processing Unit, Lithium Poly Battery used as power source, 3D printed casing for packaging the device. FIG. 4(b) illustrates an electrical schematic block diagram of the transmitter and receiver of system. The transmitter taken in external input through a push button or a touch screen display. The transmitter device generates data packets from the received data bits, on-off key (OOK) modulates the data in the digital domain and couples it to the human body through an electrode which contacts the body. The receiver device comprises an analog front-end and a Digital Processing Unit (DPU). The analog front-end filters, amplifies and demodulates the incoming OOK signal. The DPU samples the demodulated OOK signal, converts it to bits and extracts the data information from the received packets. The data rate of communication depends on the carrier frequency. In the illustrated example implementation the achievable data rate is approximately 8 kbps.

The main source of loss in EQS-HBC comes from the capacitive return path. In one embodiment, inductors are used at the transmitter and receiver end to cancel the effect of the return path capacitance. FIG. 5(a) illustrates a system diagram of the presently disclosed communication system wherein inductors are connected at the transmitter end (LTx) and the receiver end (LRx) at the transmitter end, the inductor is connected between the transmit pin and the human body. Similarly, at the receiver end a series inductor is connected with the receiver to cancel out the receiver end return path capacitance. This enables low loss HBC, but at a narrowband of frequency determined by the inductance and return path capacitance.

Figure 5B:
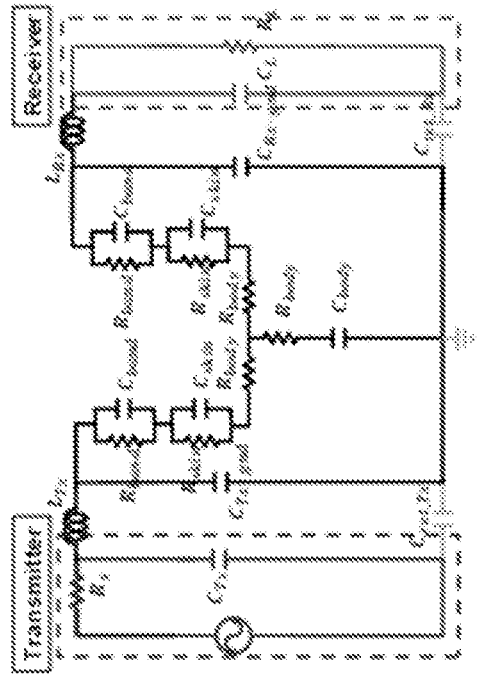
FIG. 5(b) illustrates a bio-physical model of the human body in a capacitive voltage mode scenario with resonant HBC, in accordance with one or more embodiments.
Figure 5A:
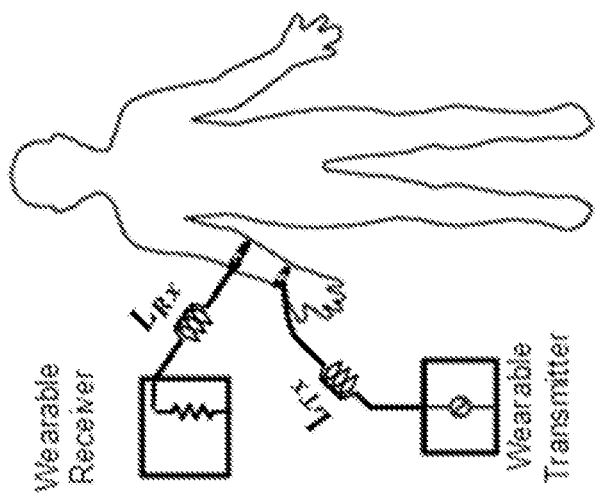
FIG. 5(a) illustrates a system diagram of a communication system, in accordance with one or more embodiments.

FIG. 5(b) illustrates a bio-physical model of the human body in a capacitive voltage mode scenario with resonant HBC. The different components of the model and example range values are provided in the table below:

| Component | Range | Description |
| --- | --- | --- |
| $R_s$ | 50 Ω-5 KΩ | Output resistance of the transmitter |
| $C_{Tx}$ | 100-500 fF | Capacitance between transmitter ground and body |
| $C_{ret\_Tx}$ | 1-20 pF | Return Path Capacitance at the transmitter end |
| $L_{Tx}$ | 0.1-10 mH | Cancellation inductance at the transmitter end |
| $C_{Tx\_gnd}$ | 25-150 pF | Body to ground capacitance at the transmitter end |
| $R_{band}$ | 100 Ω | Band Electrode resistance |
| $C_{band}$ | 200 pF-2 nF | Capacitance between band and skin |
| $R_{skin}$ | 5-50 KΩ | Unit Skin Resistance |
| $C_{skin}$ | 100 pF-5 nF | Unit Skin Capacitance |
| $R_{body}$ | 100 Ω-1 KΩ | Subcutaneous Tissue Resistance |
| $C_{body}$ | 2-20 pF | Feet to Ground Capacitance |
| $C_{Rx\_gnd}$ | 25-150 pF | Body to ground capacitance at the receiver end |
| $L_{Rx}$ | 0.1-10 mH | Cancellation inductance at the receiver end |
| $C_L$ | 10-100 pF | Load Capacitance (Receiver Input Capacitance) |
| $R_L$ | 1-10 MΩ | Load Resistance (Receiver input resistance) |

Figures 6A, 6B:
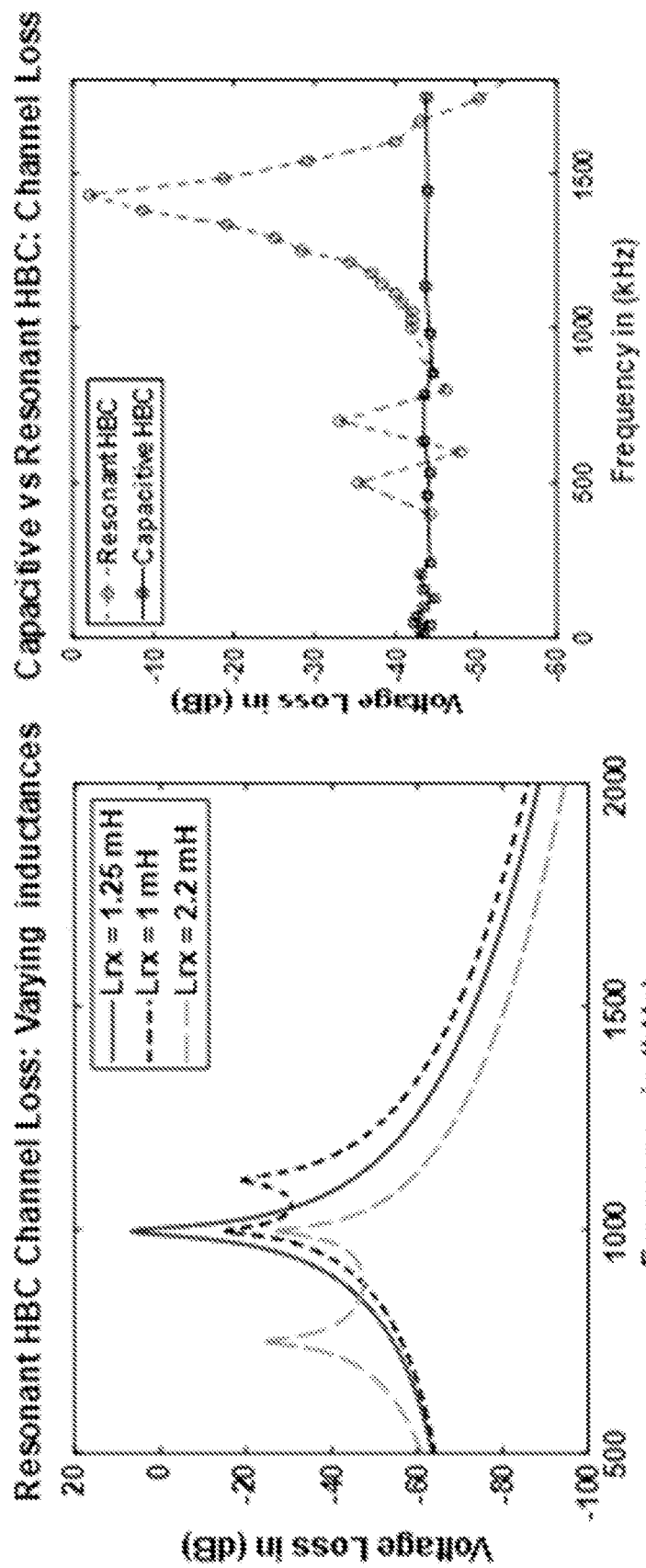
FIG. 6 illustrates the channel loss comparison for the presently disclosed inductive cancellation based resonant HBC system compared to capacitive HBC.

FIG. 6 illustrates the channel loss comparison for the presently disclosed inductive cancellation based resonant HBC system compared to capacitive HBC. It can be seen that for a narrow band of frequencies the channel loss can be significantly lower for resonant HBC compared to capacitive EQS HBC. With a carrier frequency below a few MHz it is possible to have a bandwidth of 10s of Kbps, which is sufficient for low bandwidth human computer interaction applications such as secure authentication.

The signal modulation used in the illustrated case is On Off Keying (OOK). During the transmission of a 1 bit the carrier is transmitted, while during the transmission of a 0 bit no carrier is passed.

When multiple devices are present in the network then Time Division Multiple Access (TDMA) can be used by the devices to access the body channel when they are transmitting. Since, the body is a shared channel, multiple devices cannot transmit signals simultaneously without corrupting the signal transmission. Hence, TDMA is necessary when multiple transmitting devices will communicate with each other using capacitive voltage mode HBC.

One of the key aspects of resonant HBC is the ability of the transmitter to be able to transmit at the narrow bandwidth around the resonant peak. This requires an automatic detection loop at the transmitter end, where it senses the transmitted voltage to find the optimum transmission frequency. The presently disclosed system is designed to ensure the optimum transmission frequency for the overall system is very close to the optimum for the detected peak at the transmitter end. Through this the transmitter can automatically sense back the voltage at the transmitter end and find the optimum transmission frequency minimizing overall loss.

The strictly touch based communication enabled by the EQS-HBC system can be used for applications such as secure authentication (e.g. opening a door, pairing a smart device) and information exchange (e.g. payment, image, medical data, personal profile transfer). The human body acts as a secure physical channel and the attacker has to come in extremely close proximity with the person to snoop data. This is not possible in wireless radio links, where the signal is available to any device within a certain range. Hence the presently disclosed EQS-HBC system can be utilized to act as a secure key exchange channel for wireless protocols.

Example 1

Further with respect to FIG. 4(b), a method of using a HBC device includes enabling electro-quasistatic communication on a transmitter, wherein the enabling electro-quasistatic communication includes receiving an activation signal through an input. The enabling the electro-quasistatic communication additionally includes transmitting a digital data signal to a transmitter logic circuit. The enabling the electro-quasistatic communication further includes modulating an electro-quasistatic carrier signal by the digital data signal using a modulator, thereby producing a modulated electro-quasistatic signal. The transmitter logic circuit includes the modulator. The modulated electro-quasistatic signal has a frequency ranging from 50 kHz to 5 MHz. Additionally, the enabling the electro-quasistatic communication includes transmitting the electro-quasistatic signal from the transmitter logic circuit to a general purpose input output circuit. Furthermore, the enabling the electro-quasistatic communication also includes coupling the electro-quasistatic signal on a human body through an electrode, thereby enabling electro-quasistatic communication, wherein the transmitter includes the electrode. Next, the method of using the HBC device includes transmitting the electro-quasistatic signal through the human body. Additionally, the method of using the HBC device includes coupling the electro-quasistatic signal onto a receiver electrode, wherein a receiver includes the receiver electrode. Moreover, the method of using the HBC device includes removing interferences from the electro-quasistatic signal using a filter, thereby producing a refined electro-quasistatic signal. Next, the method of using the HBC device include amplifying the refined electro-quasistatic signal using an amplifier, thereby generating an amplified electro-quasistatic signal. Furthermore, the method of using the HBC device includes converting the amplified electro-quasistatic signal into a digitized received signal. The method of using the HBC device also includes demodulating and decoding the digitized received signal using a decoding logic circuit.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In at least one embodiment, the transmitting the digital data signal to the transmitter logic circuit includes transmitting the digital data signal stored onto an on-board memory, wherein the transmitter includes the on-board memory.

In at least one embodiment, the enabling electro-quasistatic communication further includes after the receiving the activation signal through the input, sampling the activation signal using a sampler and a timer, thereby generating a sampled activation signal. Next, the method includes digitizing the sampled activation signal using an analog to digital converter, thereby initiating transmission of the digital data signal to the transmitter logic circuit.

In at least one embodiment, the coupling the electro-quasistatic signal onto the receiver electrode includes physically contacting the human body to couple the electro-quasistatic signal onto the receiver electrode.

In at least one embodiment, the converting the amplified electro-quasistatic signal into the digitized received signal includes sampling the amplified electro-quasistatic signal using a second sampler and a second timer, thereby generating a sampled amplified electro-quasistatic signal. The receiver includes the second sampler and the second timer. Next, the method includes digitizing the sampled amplified electro-quasistatic signal using a second analog to digital converter, thereby initiating transmission of the digitized received signal to the decoding logic circuit, wherein the receiver comprises the second analog to digital converter and the decoding logic circuit.

In some embodiments, the sampling the amplified electro-quasistatic signal using the second sampler and the second timer, thereby generating the sampled amplified electro-quasistatic signal includes oversampling or undersampling the amplified electro-quasistatic signal using the second sampler and the second timer.

In at least one embodiment, the demodulating and decoding the digitized received signal using the decoding logic circuit, thereby generating a received digital data includes using a digital demodulation circuit to retrieve the received digital data. The decoding logic circuit includes the digital demodulation circuit. The method also includes removing the electro-quasistatic carrier signal from the digitized received signal using the digital demodulation circuit. Next, the method includes synchronizing the received digital data with a clock and data recovery circuit to recover transmitter timing information, thereby producing a synchronized received digital data. The decoding logic circuit comprises the clock and data recovery circuit. The method also includes decoding the synchronized received digital data with a decoding circuit, thereby generating final digital bits. The decoding logic circuit includes the decoding circuit.

Example 2

Additionally with respect to FIG. 4(b), a HBC device includes a transmitter, wherein the transmitter is configured to enable electro-quasistatic communication. The transmitter includes an input, wherein the input is configured to receive an activation signal. The transmitter further includes a sampler and a timer, wherein the sampler and the timer are configured to sample the activation signal. Next, the transmitter includes an analog to digital converter, wherein the analog to digital converter is configured to digitize the sampled activation signal, thereby initiating transmission of a digital data signal to a transmitter logic circuit. The transmitter also includes the transmitter logic circuit, wherein the transmitter logic circuit is configured to receive the digital data signal. Next, the transmitter includes a modulator, wherein the modulator is configured to modulate an electro-quasistatic carrier signal by the digital data signal, thereby producing a modulated electro-quasistatic signal. The transmitter logic circuit includes the modulator. The modulated electro-quasistatic signal has a frequency ranging from 50 kHz to 5 MHz. Additionally, the transmitter includes a general purpose input output circuit, wherein the general purpose input output circuit is configured to receive the electro-quasistatic signal from the transmitter logic circuit. Furthermore, the transmitter includes an electrode, wherein the electrode is configured to couple the electro-quasistatic signal on a human body, thereby enabling electro-quasistatic communication.

Additionally, the HBC device includes a receiver. The receiver includes a receiver electrode, wherein the receiver electrode is configured to couple the electro-quasistatic signal. Moreover, the receiver also includes a filter, wherein the filter is configured to remove interferences from the electro-quasistatic signal, thereby producing a refined electro-quasistatic signal. Next, the receiver includes an amplifier, wherein the amplifier is configured to amplify the refined electro-quasistatic signal, thereby generating an amplified electro-quasistatic signal. Furthermore, the receiver includes a first device, wherein the first device is configured to convert the amplified electro-quasistatic signal into a digitized received signal. The receiver also includes a decoding logic circuit, wherein the decoding logic circuit is configured to demodulate and decode the digitized received signal.

In at least one embodiment, the first device includes a second sampler and a second timer, wherein the second sampler and the second timer are configured to sample the amplified electro-quasistatic signal, thereby generating a sampled amplified electro-quasistatic signal. The first device also includes a second analog to digital converter, wherein the second analog to digital converter is configured to digitize the sampled amplified electro-quasistatic signal, thereby initiating transmission of the digitized received signal to the decoding logic circuit.

In at least one embodiment, the decoding logic circuit includes a digital demodulation circuit, wherein the digital demodulation circuit is configured to retrieve a received digital data and remove the electro-quasistatic carrier signal from the digitized received signal. The decoding logic circuit includes a clock and data recovery circuit, wherein the clock and data recovery circuit are configured to synchronize the received digital data, thereby producing a synchronized received digital data. The decoding logic circuit also includes the decoding circuit, wherein the decoding circuit is configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying. In at least one embodiment, the transmitter logic circuit includes an on-board memory.

Example 3

A HBC device includes a transmitter, wherein the transmitter is configured to enable electro-quasistatic communication. The transmitter includes an input, wherein the input is configured to receive an activation signal. The transmitter further includes a microcontroller, wherein the microcontroller is configured to sample the activation signal. Next, the microcontroller is configured to digitize the sampled activation signal, thereby initiating transmission of a digital data signal. The microcontroller is also configured to transmit the digital data signal. Next, the microcontroller is configured to modulate an electro-quasistatic carrier signal by the digital data signal, thereby producing a modulated electro-quasistatic signal. The modulated electro-quasistatic signal has a frequency ranging from 50 kHz to 5 MHz. Additionally, the microcontroller is configured to receive the electro-quasistatic signal. Furthermore, the transmitter includes an electrode, wherein the electrode is configured to couple the electro-quasistatic signal on a human body, thereby enabling electro-quasistatic communication.

Additionally, the HBC device includes a receiver. The receiver includes a receiver electrode, wherein the receiver electrode is configured to couple the electro-quasistatic signal. Moreover, the receiver also includes a filter, wherein the filter is configured to remove interferences from the electro-quasistatic signal, thereby producing a refined electro-quasistatic signal. Next, the receiver includes an amplifier, wherein the amplifier is configured to amplify the refined electro-quasistatic signal, thereby generating an amplified electro-quasistatic signal. Furthermore, the receiver includes a second microcontroller, wherein the second microcontroller is configured to convert the amplified electro-quasistatic signal into a digitized received signal. The microcontroller is also configured to demodulate and decode the digitized received signal.

In at least one embodiment, the second microcontroller is configured to sample the amplified electro-quasistatic signal, thereby generating a sampled amplified electro-quasistatic signal. The second microcontroller is also configured to digitize the sampled amplified electro-quasistatic signal, thereby initiating transmission of the digitized received signal.

In at least one embodiment, the second microcontroller is configured to retrieve a received digital data and remove the electro-quasistatic carrier signal from the digitized received signal. The second microcontroller is also configured to synchronize the received digital data, thereby producing a synchronized received digital data. The second microcontroller is configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password.

Example 4

A HBC device includes a transmitter, wherein the transmitter is configured to enable electro-quasistatic communication. The transmitter includes an input, wherein the input is configured to receive an activation signal. The transmitter further includes a communication module, wherein the communication module is configured to sample the activation signal. Next, the communication module is configured to digitize the sampled activation signal, thereby initiating transmission of a digital data signal. The communication module is also configured to transmit the digital data signal. Next, the communication module is configured to modulate an electro-quasistatic carrier signal by the digital data signal, thereby producing a modulated electro-quasistatic signal. The modulated electro-quasistatic signal has a frequency ranging from 50 kHz to 5 MHz. Additionally, the communication module is configured to receive the electro-quasistatic signal. Furthermore, the transmitter includes an electrode, wherein the electrode is configured to couple the electro-quasistatic signal on a human body, thereby enabling electro-quasistatic communication.

Additionally, the HBC device includes a receiver. The receiver includes a receiver electrode, wherein the receiver electrode is configured to couple the electro-quasistatic signal. Moreover, the receiver also includes a filter, wherein the filter is configured to remove interferences from the electro-quasistatic signal, thereby producing a refined electro-quasistatic signal. Next, the receiver includes an amplifier, wherein the amplifier is configured to amplify the refined electro-quasistatic signal, thereby generating an amplified electro-quasistatic signal. Furthermore, the receiver includes a second communication module, wherein the second communication module is configured to convert the amplified electro-quasistatic signal into a digitized received signal. The communication module is also configured to demodulate and decode the digitized received signal.

In at least one embodiment, the second communication module is configured to sample the amplified electro-quasistatic signal, thereby generating a sampled amplified electro-quasistatic signal. The second communication module is also configured to digitize the sampled amplified electro-quasistatic signal, thereby initiating transmission of the digitized received signal.

In at least one embodiment, the second communication module is configured to retrieve a received digital data and remove the electro-quasistatic carrier signal from the digitized received signal. The second communication module is also configured to synchronize the received digital data, thereby producing a synchronized received digital data. The second communication module is configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password.

Example 5

A HBC device includes a transmitter, wherein the transmitter is configured to enable electro-quasistatic communication. The transmitter includes an input, wherein the input is configured to receive an activation signal. The transmitter further includes an application specific integrated circuit (ASIC), wherein the application specific integrated circuit (ASIC) is configured to sample the activation signal. Next, the application specific integrated circuit (ASIC) is configured to digitize the sampled activation signal, thereby initiating transmission of a digital data signal. The application specific integrated circuit (ASIC) is also configured to transmit the digital data signal. Next, the application specific integrated circuit (ASIC) is configured to modulate an electro-quasistatic carrier signal by the digital data signal, thereby producing a modulated electro-quasistatic signal. The modulated electro-quasistatic signal has a frequency ranging from 50 kHz to 5 MHz. Additionally, the application specific integrated circuit (ASIC) is configured to receive the electro-quasistatic signal. Furthermore, the transmitter includes an electrode, wherein the electrode is configured to couple the electro-quasistatic signal on a human body, thereby enabling electro-quasistatic communication.

Additionally, the HBC device includes a receiver. The receiver includes a receiver electrode, wherein the receiver electrode is configured to couple the electro-quasistatic signal. Moreover, the receiver also includes a filter, wherein the filter is configured to remove interferences from the electro-quasistatic signal, thereby producing a refined electro-quasistatic signal. Next, the receiver includes an amplifier, wherein the amplifier is configured to amplify the refined electro-quasistatic signal, thereby generating an amplified electro-quasistatic signal. Furthermore, the receiver includes a second application specific integrated circuit (ASIC), wherein the second application specific integrated circuit (ASIC) is configured to convert the amplified electro-quasistatic signal into a digitized received signal. The application specific integrated circuit (ASIC) is also configured to demodulate and decode the digitized received signal.

In at least one embodiment, the second application specific integrated circuit (ASIC) is configured to sample the amplified electro-quasistatic signal, thereby generating a sampled amplified electro-quasistatic signal. The second application specific integrated circuit (ASIC) is also configured to digitize the sampled amplified electro-quasistatic signal, thereby initiating transmission of the digitized received signal.

In at least one embodiment, the second application specific integrated circuit (ASIC) is configured to retrieve a received digital data and remove the electro-quasistatic carrier signal from the digitized received signal. The second application specific integrated circuit (ASIC) is also configured to synchronize the received digital data, thereby producing a synchronized received digital data. The second application specific integrated circuit (ASIC) is configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password.

Example 6

Additionally with respect to FIG. 5(b), a method of using a HBC device includes enabling resonant electro-quasistatic communication on a transmitter. The enabling the resonant electro-quasistatic communication includes receiving an activation signal through an input. Additionally, the enabling the resonant electro-quasistatic communication includes transmitting a digital data signal to a transmitter logic circuit. Moreover, the enabling the resonant electro-quasistatic communication includes modulating an electro-quasistatic carrier signal by the digital data signal using a modulator, thereby producing a modulated electro-quasistatic signal. The transmitter logic circuit includes the modulator. The modulated electro-quasistatic signal has a frequency ranging from 50 kHz to 5 MHz. Next, the enabling the resonant electro-quasistatic communication includes transmitting the electro-quasistatic signal from the transmitter logic circuit to a general purpose input output circuit. Furthermore, the enabling the resonant electro-quasistatic communication includes coupling the electro-quasistatic signal with at least one inductor, thereby enabling resonant electro-quasistatic communication. The transmitter includes the inductor. Additionally, the enabling the resonant electro-quasistatic communication includes coupling the resonant electro-quasistatic signal on a human body through an electrode, thereby enabling resonant electro-quasistatic communication. The transmitter includes the electrode. The method of using the HBC device includes transmitting the resonant electro-quasistatic signal through the human body. Next, the method of using the HBC device includes coupling the resonant electro-quasistatic signal onto at least one second inductor. The receiver includes the second inductor. Additionally, the method of using the HBC device includes coupling the resonant electro-quasistatic signal onto a receiver electrode from the second inductor. The receiver includes the receiver electrode. Further, the method of using the HBC device includes removing interferences from the resonant electro-quasistatic signal using a filter, thereby producing a refined resonant electro-quasistatic signal. The method of using the HBC device also includes amplifying the refined resonant electro-quasistatic signal using an amplifier, thereby generating an amplified resonant electro-quasistatic signal. Further, the method of using the HBC device includes converting the amplified resonant electro-quasistatic signal into a digitized received signal. The method of using the HBC device also includes demodulating and decoding the digitized received signal using a decoding logic circuit.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In at least one embodiment, the transmitting the digital data signal to the transmitter logic circuit includes transmitting the digital data signal stored onto an on-board memory, wherein the transmitter includes the on-board memory.

In one or more embodiments, the enabling resonant electro-quasistatic communication further includes after the receiving the activation signal through the input, sampling the activation signal using a sampler and a timer, thereby generating a sampled activation signal. The method further includes digitizing the sampled activation signal using an analog to digital converter, thereby initiating transmission of the digital data signal to the transmitter logic circuit.

In one or more embodiments, the coupling the resonant electro-quasistatic signal onto the receiver electrode includes physically contacting the human body to couple the resonant electro-quasistatic signal onto the receiver electrode.

In one or more embodiments, the converting the amplified resonant electro-quasistatic signal into the digitized received signal includes sampling the amplified resonant electro-quasistatic signal using a second sampler and a second timer, thereby generating a sampled amplified resonant electro-quasistatic signal. The receiver includes the second sampler and the second timer. The method also includes digitizing the sampled amplified resonant electro-quasistatic signal using a second analog to digital converter, thereby initiating transmission of a digitized received signal to the decoder logic circuit. The receiver includes the second analog to digital converter and the decoder logic circuit.

In some embodiments, the sampling the amplified resonant electro-quasistatic signal using the second sampler and the second timer, thereby generating the sampled amplified resonant electro-quasistatic signal, includes oversampling or undersampling the amplified resonant electro-quasistatic signal using the second sampler and the second timer.

In one or more embodiments, the demodulating and decoding the digitized received signal using the decoding logic circuit, thereby generating a received digital data includes using a digital demodulation circuit to retrieve the received digital data. The decoding logic circuit includes the digital demodulation circuit. The method also includes removing the electro-quasistatic carrier signal from the digitized received signal using the digital demodulation circuit. Additionally, the method includes synchronizing the received digital data with a clock and data recovery circuit to recover transmitter timing information, thereby producing a synchronized received digital data. The decoding logic circuit includes the clock and data recovery circuit. Furthermore, the method includes decoding the synchronized received digital data with a decoding circuit, thereby generating final digital bits. The decoding logic circuit comprises the decoding circuit.

In one or more embodiments, the coupling the electro-quasistatic signal with the inductor, thereby enabling resonant electro-quasistatic communication, wherein the transmitter comprises the inductor, includes inducing a series resonance and thereby maximizing current through the inductor, wherein the inductor is in series with a voltage source of the transmitter and the human body. In some embodiments, the inducing the series resonance and thereby maximizing current through the inductor, wherein the inductor is in series with the voltage source of the transmitter and the human body includes transferring a transferring maximum of voltage and power through the human body.

Figure 7:
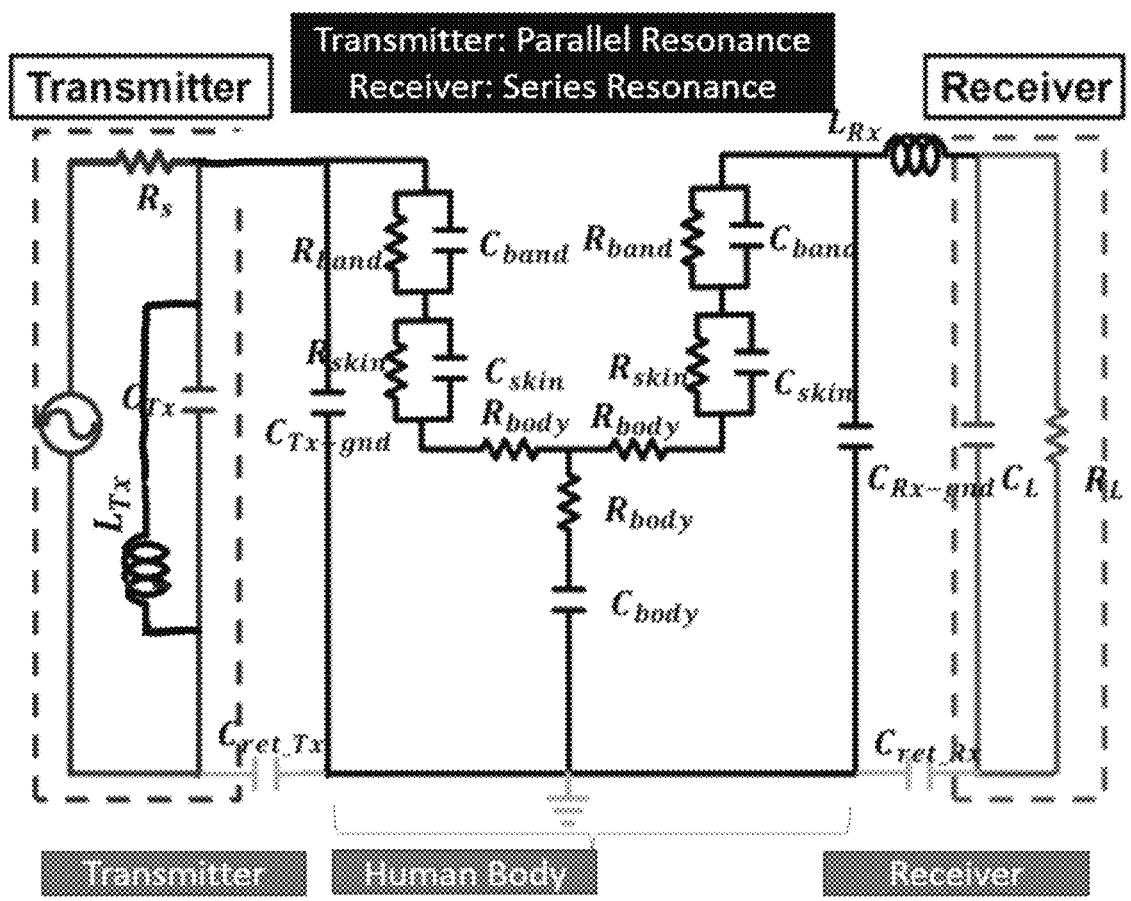
FIG. 7 illustrates another bio-physical model of the human body in a capacitive voltage mode scenario with resonant HBC, in accordance with one or more embodiments.
Figure 9:
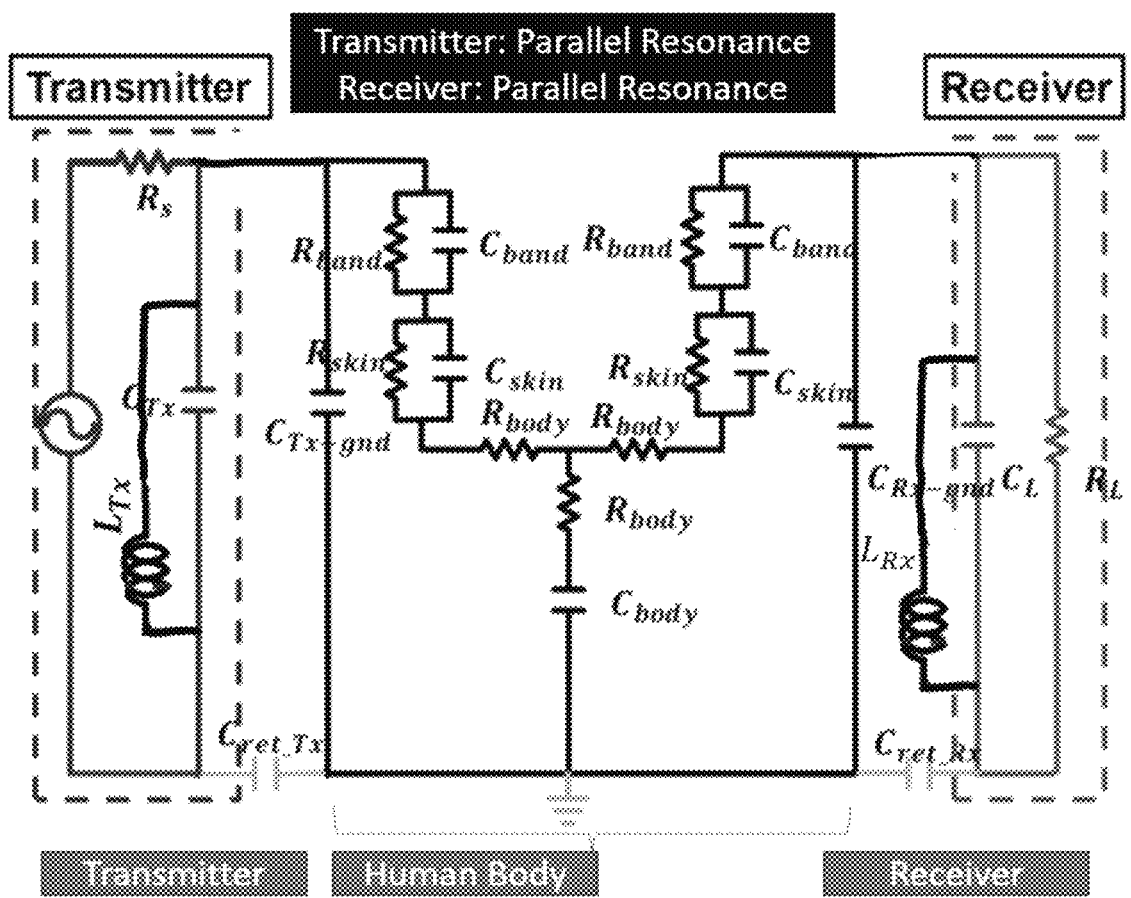
FIG. 9 illustrates another bio-physical model of the human body in a capacitive voltage mode scenario with resonant HBC, in accordance with one or more embodiments.

In one or more embodiments, the coupling the electro-quasistatic signal with the inductor, thereby enabling resonant electro-quasistatic communication, wherein the transmitter comprises the inductor, includes inducing a parallel resonance and thereby minimizing current through the inductor, wherein the inductor is in parallel with a voltage source of the transmitter and the human body (see FIG. 7 and FIG. 9). In some embodiments, the inducing the parallel resonance and thereby minimizing current through the inductor, wherein the inductor is in parallel with the voltage source of the transmitter and the human body, includes minimizing power consumption for iso voltage coupling on the human body.

In at least one embodiment, the coupling the resonant electro-quasistatic signal onto at least one second inductor, wherein the receiver comprises the second inductor, includes inducing a series resonance through the second inductor. The second inductor is in series with the human body.

Figure 8:
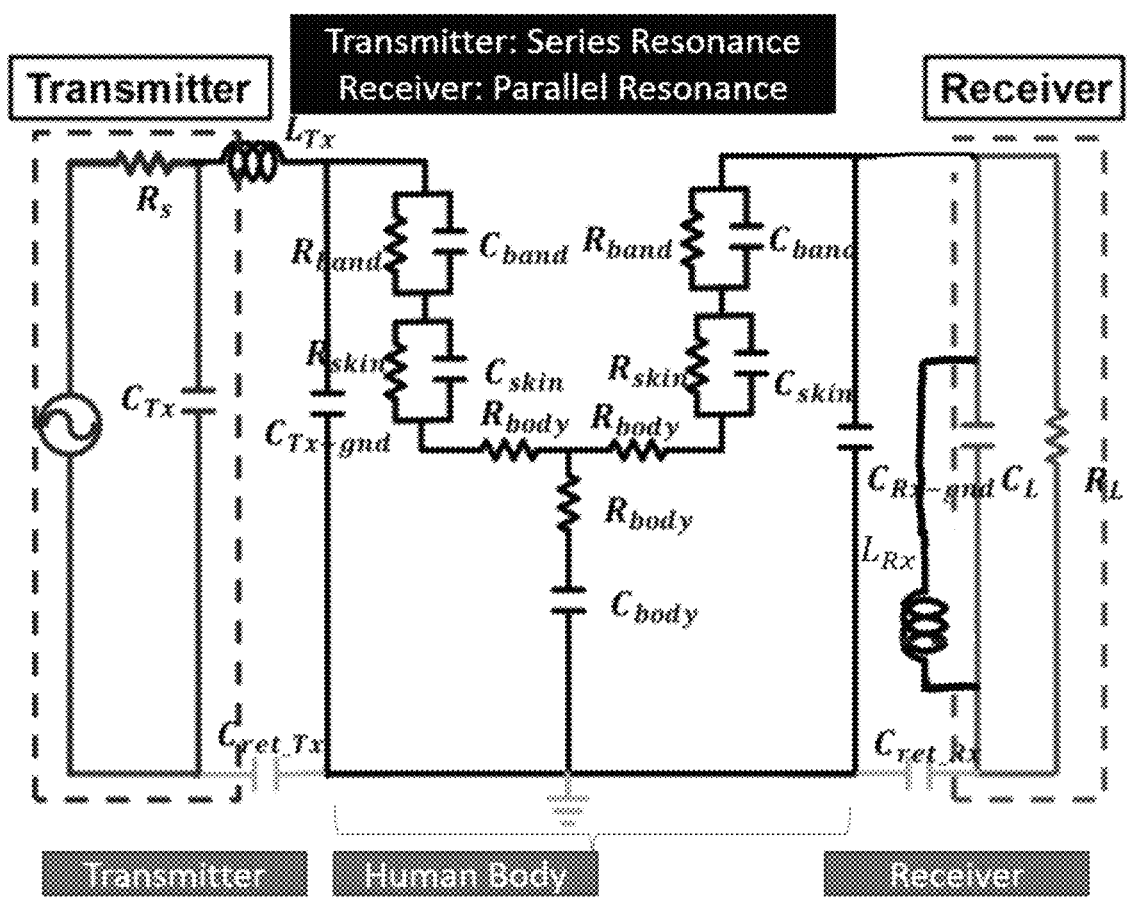
FIG. 8 illustrates another bio-physical model of the human body in a capacitive voltage mode scenario with resonant HBC, in accordance with one or more embodiments.

In at least one embodiment, the coupling the resonant electro-quasistatic signal onto at least one second inductor, wherein the receiver comprises the second inductor, includes inducing a parallel resonance through the second inductor (see FIG. 8 and FIG. 9). The second inductor is in parallel with the human body.

Example 7

Further with respect to FIG. 5(b), a HBC device includes a transmitter, wherein the transmitter is configured to enable resonant electro-quasistatic communication. The transmitter includes an input, wherein the input is configured to receive an activation signal. Next, the transmitter includes a sampler and a timer, wherein the sampler and the timer are configured to sample the activation signal, thereby generating a sampled activation signal. Further, the transmitter includes an analog to digital converter, wherein the analog to digital converter is configured to digitize the sampled activation signal, thereby initiating transmission of the digital data signal to a transmitter logic circuit. The transmitter includes the transmitter logic circuit, wherein the transmitter logic circuit is configured to receive a digital data signal. Moreover, the transmitter includes a modulator, wherein the modulator is configured to modulate an electro-quasistatic carrier signal by the digital data signal, thereby producing a modulated electro-quasistatic signal. The modulated electro-quasistatic signal has a frequency ranging from 50 kHz to 5 MHz. Next, the transmitter includes a general purpose input output circuit, wherein the general purpose input output circuit is configured to receive the electro-quasistatic signal from the transmitter logic circuit. Furthermore, the transmitter includes at least one inductor, wherein the at least one inductor is configured to couple the electro-quasistatic signal, thereby enabling resonant electro-quasistatic communication. Additionally, the transmitter includes an electrode, wherein the electrode is configured to couple the resonant electro-quasistatic signal on a human body, thereby enabling resonant electro-quasistatic communication. In at least one embodiment, the transmitter logic circuit includes an onboard memory.

Additionally, the HBC device includes a receiver. The receiver includes at least one second inductor, wherein the at least one second inductor is configured to couple the resonant electro-quasistatic signal. Additionally, the receiver includes a receiver electrode, wherein the receiver electrode is configured to couple the resonant electro-quasistatic signal. Further, the receiver includes a filter, wherein the filter is configured to remove interferences from the resonant electro-quasistatic signal, thereby producing a refined resonant electro-quasistatic signal. Additionally, the receiver includes an amplifier, wherein the amplifier is configured to amplify the refined resonant electro-quasistatic signal, thereby generating an amplified resonant electro-quasistatic signal. Further, the receiver includes a first device, wherein the first device is configured to convert the amplified resonant electro-quasistatic signal into a digitized received signal. The receiver also includes a decoding logic circuit, wherein the decoding logic circuit is configured to demodulate and decoding the digitized received signal.

In at least one embodiment, the first device includes a second sampler and a second timer, wherein the second sampler and the second timer are configured to sample the amplified resonant electro-quasistatic signal, thereby generating a sampled amplified resonant electro-quasistatic signal. The first device also includes a second analog to digital converter, wherein the second analog to digital converter is configured to digitize the sampled amplified resonant electro-quasistatic signal, thereby initiating transmission of the digitized received signal to the decoding logic circuit.

In at least one embodiment, the decoding logic circuit includes a digital demodulation circuit, wherein the digital demodulation circuit is configured to retrieve a received digital data and remove the electro-quasistatic carrier signal from the digitized received signal. The decoding logic circuit includes a clock and data recovery circuit, wherein the clock and data recovery circuit are configured to synchronize the received digital data, thereby producing a synchronized received digital data. The decoding logic circuit also includes the decoding circuit, wherein the decoding circuit is configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In one or more embodiments, the inductor is in series with a voltage source of the transmitter and a human body. In some embodiments, the inductor is in parallel with a voltage source of the transmitter and the human body.

In at least one embodiment, the second inductor is in series with the human body. In some embodiments, the second inductor is in parallel with the human body.

Example 8

A HBC device includes a transmitter, wherein the transmitter is configured to enable resonant electro-quasistatic communication. The transmitter includes a microcontroller, wherein the microcontroller is configured to receive an activation signal. Next, the microcontroller is configured to sample the activation signal, thereby generating a sampled activation signal. Further, the microcontroller is configured to digitize the sampled activation signal, thereby initiating transmission of the digital data signal to a transmitter logic circuit. The microcontroller is configured to receive a digital data signal. Moreover, the microcontroller is configured to modulate an electro-quasistatic carrier signal by the digital data signal, thereby producing a modulated electro-quasistatic signal. The modulated electro-quasistatic signal has a frequency ranging from 50 kHz to 5 MHz. Next, the microcontroller is configured to receive the electro-quasistatic signal. Furthermore, the microcontroller is configured to couple the electro-quasistatic signal, thereby enabling resonant electro-quasistatic communication. Additionally, the transmitter includes an electrode, wherein the electrode is configured to couple the resonant electro-quasistatic signal on a human body, thereby enabling resonant electro-quasistatic communication.

Additionally, the HBC device includes a receiver. The receiver includes at least one second inductor, wherein the at least one second inductor is configured to couple the resonant electro-quasistatic signal. Additionally, the receiver includes a receiver electrode, wherein the receiver electrode is configured to couple the resonant electro-quasistatic signal. Further, the receiver includes a filter, wherein the filter is configured to remove interferences from the resonant electro-quasistatic signal, thereby producing a refined resonant electro-quasistatic signal. Additionally, the receiver includes an amplifier, wherein the amplifier is configured to amplify the refined resonant electro-quasistatic signal, thereby generating an amplified resonant electro-quasistatic signal. Further, the receiver includes a second microcontroller, wherein the second microcontroller is configured to convert the amplified resonant electro-quasistatic signal into a digitized received signal. The second microcontroller is also configured to demodulate and decoding the digitized received signal.

In at least one embodiment, the second microcontroller is configured to sample the amplified resonant electro-quasistatic signal, thereby generating a sampled amplified resonant electro-quasistatic signal. The second microcontroller is also configured to digitize the sampled amplified resonant electro-quasistatic signal, thereby initiating transmission of the digitized received signal.

In at least one embodiment, the second microcontroller is configured to retrieve a received digital data and remove the electro-quasistatic carrier signal from the digitized received signal. The second microcontroller is configured to synchronize the received digital data, thereby producing a synchronized received digital data. The second microcontroller is also configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In one or more embodiments, the inductor is in series with a voltage source of the transmitter and a human body. In some embodiments, the inductor is in parallel with a voltage source of the transmitter and the human body.

In at least one embodiment, the second inductor is in series with the human body. In some embodiments, the second inductor is in parallel with the human body.

Example 9

A HBC device includes a transmitter, wherein the transmitter is configured to enable resonant electro-quasistatic communication. The transmitter includes a communication module, wherein the communication module is configured to receive an activation signal. Next, the communication module is configured to sample the activation signal, thereby generating a sampled activation signal. Further, the communication module is configured to digitize the sampled activation signal, thereby initiating transmission of the digital data signal to a transmitter logic circuit. The communication module is configured to receive a digital data signal. Moreover, the communication module is configured to modulate an electro-quasistatic carrier signal by the digital data signal, thereby producing a modulated electro-quasistatic signal. The modulated electro-quasistatic signal has a frequency ranging from 50 kHz to 5 MHz. Next, the communication module is configured to receive the electro-quasistatic signal. Furthermore, the communication module is configured to couple the electro-quasistatic signal, thereby enabling resonant electro-quasistatic communication. Additionally, the transmitter includes an electrode, wherein the electrode is configured to couple the resonant electro-quasistatic signal on a human body, thereby enabling resonant electro-quasistatic communication.

Additionally, the HBC device includes a receiver. The receiver includes at least one second inductor, wherein the at least one second inductor is configured to couple the resonant electro-quasistatic signal. Additionally, the receiver includes a receiver electrode, wherein the receiver electrode is configured to couple the resonant electro-quasistatic signal. Further, the receiver includes a filter, wherein the filter is configured to remove interferences from the resonant electro-quasistatic signal, thereby producing a refined resonant electro-quasistatic signal. Additionally, the receiver includes an amplifier, wherein the amplifier is configured to amplify the refined resonant electro-quasistatic signal, thereby generating an amplified resonant electro-quasistatic signal. Further, the receiver includes a second communication module, wherein the second communication module is configured to convert the amplified resonant electro-quasistatic signal into a digitized received signal. The second communication module is also configured to demodulate and decoding the digitized received signal.

In at least one embodiment, the second communication module is configured to sample the amplified resonant electro-quasistatic signal, thereby generating a sampled amplified resonant electro-quasistatic signal. The second communication module is also configured to digitize the sampled amplified resonant electro-quasistatic signal, thereby initiating transmission of the digitized received signal.

In at least one embodiment, the second communication module is configured to retrieve a received digital data and remove the electro-quasistatic carrier signal from the digitized received signal. The second communication module is configured to synchronize the received digital data, thereby producing a synchronized received digital data. The second communication module is also configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In one or more embodiments, the inductor is in series with a voltage source of the transmitter and a human body. In some embodiments, the inductor is in parallel with a voltage source of the transmitter and the human body.

In at least one embodiment, the second inductor is in series with the human body. In some embodiments, the second inductor is in parallel with the human body.

Example 10

A HBC device includes a transmitter, wherein the transmitter is configured to enable resonant electro-quasistatic communication. The transmitter includes an application specific integrated circuit (ASIC), wherein the application specific integrated circuit (ASIC) is configured to receive an activation signal. Next, the application specific integrated circuit (ASIC) is configured to sample the activation signal, thereby generating a sampled activation signal. Further, the application specific integrated circuit (ASIC) is configured to digitize the sampled activation signal, thereby initiating transmission of the digital data signal to a transmitter logic circuit. The application specific integrated circuit (ASIC) is configured to receive a digital data signal. Moreover, the application specific integrated circuit (ASIC) is configured to modulate an electro-quasistatic carrier signal by the digital data signal, thereby producing a modulated electro-quasistatic signal. The modulated electro-quasistatic signal has a frequency ranging from 50 kHz to 5 MHz. Next, the application specific integrated circuit (ASIC) is configured to receive the electro-quasistatic signal. Furthermore, the application specific integrated circuit (ASIC) is configured to couple the electro-quasistatic signal, thereby enabling resonant electro-quasistatic communication. Additionally, the transmitter includes an electrode, wherein the electrode is configured to couple the resonant electro-quasistatic signal on a human body, thereby enabling resonant electro-quasistatic communication.

Additionally, the HBC device includes a receiver. The receiver includes at least one second inductor, wherein the at least one second inductor is configured to couple the resonant electro-quasistatic signal. Additionally, the receiver includes a receiver electrode, wherein the receiver electrode is configured to couple the resonant electro-quasistatic signal. Further, the receiver includes a filter, wherein the filter is configured to remove interferences from the resonant electro-quasistatic signal, thereby producing a refined resonant electro-quasistatic signal. Additionally, the receiver includes an amplifier, wherein the amplifier is configured to amplify the refined resonant electro-quasistatic signal, thereby generating an amplified resonant electro-quasistatic signal. Further, the receiver includes a second application specific integrated circuit (ASIC), wherein the second application specific integrated circuit (ASIC) is configured to convert the amplified resonant electro-quasistatic signal into a digitized received signal. The second application specific integrated circuit (ASIC) is also configured to demodulate and decoding the digitized received signal.

In at least one embodiment, the second application specific integrated circuit (ASIC) is configured to sample the amplified resonant electro-quasistatic signal, thereby generating a sampled amplified resonant electro-quasistatic signal. The second application specific integrated circuit (ASIC) is also configured to digitize the sampled amplified resonant electro-quasistatic signal, thereby initiating transmission of the digitized received signal.

In at least one embodiment, the second application specific integrated circuit (ASIC) is configured to retrieve a received digital data and remove the electro-quasistatic carrier signal from the digitized received signal. The second application specific integrated circuit (ASIC) is configured to synchronize the received digital data, thereby producing a synchronized received digital data. The second application specific integrated circuit (ASIC) is also configured to decode the synchronized received digital data, thereby generating final digital bits.

In one or more embodiments, the input includes at least one of a touch sensor, a push button, a voice activation system, or a camera activation system. In one or more embodiments, the digital data signal includes at least one of a secret key, a physiological signal, a wearer's heart rate, a wearer's temperature, or a password. In one or more embodiments, the modulator includes: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

In one or more embodiments, the inductor is in series with a voltage source of the transmitter and a human body. In some embodiments, the inductor is in parallel with a voltage source of the transmitter and the human body.

In at least one embodiment, the second inductor is in series with the human body. In some embodiments, the second inductor is in parallel with the human body.

One of ordinary skill in the art would recognize that operations are added or removed from method, in one or more embodiments. One of ordinary skill in the art would also recognize that an order of operations in the above method is able to be changed, in some embodiments.

FIG. 7 illustrates another bio-physical model of the human body in a capacitive voltage mode scenario with resonant HBC, in accordance with one or more embodiments. As illustrated, the transmitter is in parallel resonance, while the receiver is in series resonance. The device description and method of using the same is similar to the respective components discussed above.

FIG. 8 illustrates another bio-physical model of the human body in a capacitive voltage mode scenario with resonant HBC, in accordance with one or more embodiments. As illustrated, the transmitter is in series resonance, while the receiver is in parallel resonance. The device description and method of using the same is similar to the respective components discussed above.

FIG. 9 illustrates another bio-physical model of the human body in a capacitive voltage mode scenario with resonant HBC, in accordance with one or more embodiments. As illustrated, the transmitter is in parallel resonance, while the receiver is in parallel resonance. The device description and method of using the same is similar to the respective components discussed above.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A method for electro-quasistatic communication between a body-worn device and receiving device, the method comprising:
   receiving, with the body-worn device, an activation signal through an input;
   transmitting a digital data signal to a transmitter logic circuit of the body-worn device;
   modulating, with a modulator of the transmitter logic circuit, an electro-quasistatic carrier signal by the digital data signal using a modulator, thereby producing a modulated electro-quasistatic signal, the modulated electro-quasistatic signal having a frequency ranging from 50 kHz to 5 MHz;
   coupling the modulated electro-quasistatic signal with a human body using an electrode, of the body-worn device, thereby enabling electro-quasistatic communication, between the body-worn device and the receiving device while the human body is in physical contact with the receiving device;
   transmitting the modulated electro-quasistatic signal through the human body;
   coupling the modulated electro-quasistatic signal onto a receiver electrode of a receiver of the receiving device, the receiver having capacitive termination;
   removing interferences from the modulated electro-quasistatic signal using a filter, thereby producing a refined electro-quasistatic signal;
   amplifying the refined electro-quasistatic signal using an amplifier, thereby generating an amplified electro-quasistatic signal;
   converting the amplified electro-quasistatic signal into a digitized received signal; and
   demodulating and decoding the digitized received signal using a decoding logic circuit,
   wherein the electro-quasistatic communication is a voltage mode communication.

2. The method of claim 1, wherein the input comprises at least one of a touch sensor, a push button, a voice activation system, or a camera activation system.

3. The method of claim 1, wherein the digital data signal comprises at least one of a secret key, a physiological signal, a wearer's heart rate, a wearer's temperature, or a password.

4. The method of claim 1, wherein the transmitting the digital data signal to the transmitter logic circuit comprises:
   transmitting the digital data signal stored onto an on-board memory, wherein the transmitter comprises the on-board memory.

5. The method of claim 1 further comprising:
   after the receiving the activation signal through the input, sampling the activation signal using a sampler and a timer, thereby generating a sampled activation signal; and
   digitizing the sampled activation signal using an analog to digital converter, thereby initiating transmission of the digital data signal to the transmitter logic circuit.

6. The method of claim 1, wherein the modulator comprises: a pulse-width modulator circuit, a pulse-position modulation circuit, a pulse frequency modulation circuit, a pulse amplitude modulation circuit, a quadratic amplitude modulator circuit, or an electro-quasistatic carrier generation circuit with On-Off Keying.

7. The method of claim 1, wherein the coupling the modulated electro-quasistatic signal onto the receiver electrode comprises:
   physically contacting the human body to couple the modulated electro-quasistatic signal onto the receiver electrode.

8. The method of claim 1, wherein the converting the amplified electro-quasistatic signal into the digitized received signal comprises:
   sampling the amplified electro-quasistatic signal using a second sampler and a second timer, thereby generating a sampled amplified electro-quasistatic signal, wherein the receiver comprises the second sampler and the second timer; and
   digitizing the sampled amplified electro-quasistatic signal using a second analog to digital converter, thereby initiating transmission of the digitized received signal to the decoding logic circuit, wherein the receiver comprises the second analog to digital converter and the decoding logic circuit.

9. The method of claim 8, wherein the sampling the amplified electro-quasistatic signal using the second sampler and the second timer, thereby generating the sampled amplified electro-quasistatic signal comprises:
   oversampling or undersampling the amplified electro-quasistatic signal using the second sampler and the second timer.

10. The method of claim 1, wherein the demodulating and decoding the digitized received signal using the decoding logic circuit, thereby generating a received digital data comprises:
    using a digital demodulation circuit to retrieve the received digital data, wherein the decoding logic circuit comprises the digital demodulation circuit;
    removing the electro-quasistatic carrier signal from the digitized received signal using the digital demodulation circuit;
    synchronizing the received digital data with a clock and data recovery circuit to recover transmitter timing information, thereby producing a synchronized received digital data, wherein the decoding logic circuit comprises the clock and data recovery circuit; and
    decoding the synchronized received digital data with a decoding circuit, thereby generating final digital bits, wherein the decoding logic circuit comprises the decoding circuit.

11. A method for electro-quasistatic communication between a body-worn device and a receiving device, the method comprising:
    receiving, with the body-worn device, an activation signal through an input;
    transmitting a digital data signal to a transmitter logic circuit of the body-worn device;
    modulating, with a modulator of the transmitter logic circuit, an electro-quasistatic carrier signal by the digital data signal using a modulator, thereby producing a modulated electro-quasistatic signal, the modulated electro-quaisastic signal having a frequency ranging from 50 kHz to 5 MHz; and
    coupling the modulated electro-quasistatic signal with a human body using an electrode of the body-worn device, thereby enabling electro-quasistatic communication between the body-worn device and the receiving device while the human body is in physical contact with the receiving device,
    wherein the electro-quasistatic communication is a voltage mode communication, and
    wherein the receiving device has a receiver with capacitive termination.

12. The method of claim 11, wherein the input comprises at least one of a touch sensor, a push button, a voice activation system, or a camera activation system.

13. The method of claim 11, wherein the digital data signal comprises at least one of a secret key, a physiological signal, a wearer's heart rate, a wearer's temperature, or a password.

14. The method of claim 11, transmitting the digital data signal to the transmitter logic circuit comprises:
transmitting the digital data signal stored onto an on-board memory, wherein the transmitter comprises the on-board memory.

15. The method of claim 11 further comprising:
after the receiving the activation signal through the input, sampling the activation signal using a sampler and a timer, thereby generating a sampled activation signal; and
digitizing the sampled activation signal using an analog to digital converter, thereby initiating transmission of the digital data signal to the transmitter logic circuit.

16. The method of claim 11, wherein the modulator comprises: a pulse-width modulator circuit, a pulse-position modulation circuit, a pulse frequency modulation circuit, a pulse amplitude modulation circuit, a quadratic amplitude modulator circuit, or a electro-quasistatic carrier generation circuit with On-Off Keying.

17. A method of transmitting information during a touch event, wherein the touch event occurs between a portion of a human body and a receiving device, wherein the method comprises:
initiating human-body communication (HBC) from a transmitter, wherein the initiating HBC includes:
receiving an activation signal through an input;
generating a digital data signal in response to receiving the activation signal;
modulating the digital data signal using a modulator, thereby producing a modulated signal; and
during the touch event, transmitting the modulated signal through a human body via an electrode to the receiving device, wherein the transmitter is communicatively coupled with the electrode,
wherein the transmitting the modulated signal through the human body to the receiving device is a voltage mode communication, and
wherein the receiving device has a receiver with capacitive termination.

18. The method of claim 17, wherein the input includes at least one of a touch sensor, a push button, a voice activation system, or a camera activation system.

19. The method of claim 17, wherein the digital data signal includes at least one of a secret key, a physiological signal, a wearer's heart rate, a wearer's temperature, or a password.

20. The method of claim 17, further comprising:
transmitting the digital data signal to an on-board memory, wherein the transmitter is communicatively coupled with the on-board memory.

* * * * *